Figure 1:
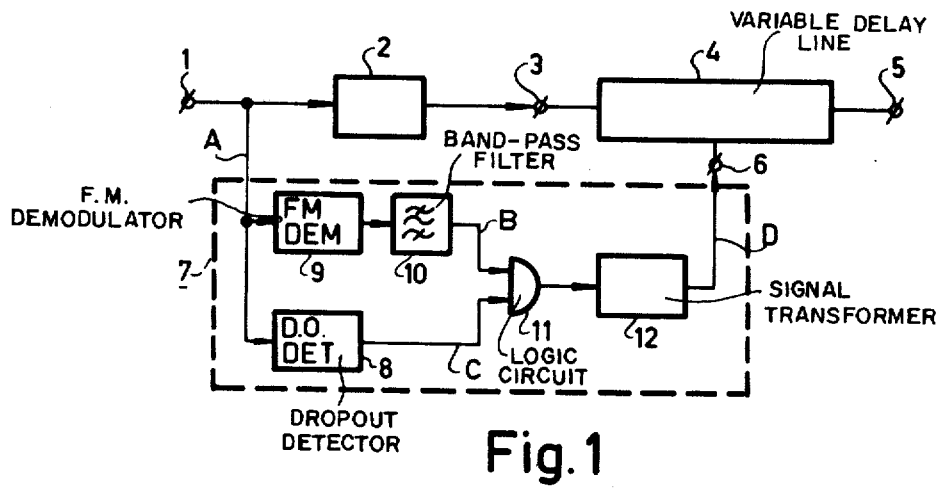

United States Patent [19]

Kenney

[11] 4,000,511
[45] Dec. 28, 1976

[54] DEVICE FOR THE COMPENSATION OF DROP-OUTS IN A ANGLE-VELOCITY MODULATED SIGNAL

[75] Inventor: George Churchill Kenney, Briarcliff Manor, N.Y.

[73] Assignee: North American Philips Corporation, New York, N.Y.

[22] Filed: June 24, 1975

[21] Appl. No.: 589,763

[30] Foreign Application Priority Data

Mar. 14, 1975 Netherlands .................. 7503049

[52] U.S. Cl. ................................. 360/38; 358/8
[51] Int. Cl.² ................................. H04N 5/785
[58] Field of Search ...................... 358/8; 360/38

[56] References Cited

UNITED STATES PATENTS

| | | | |
|---|---|---|---|
| 2,996,576 | 8/1961 | Dolby | 360/38 |
| 3,461,230 | 8/1969 | Hodge et al. | 360/38 |
| 3,463,874 | 8/1969 | Hodge et al. | 358/8 |
| 3,824,620 | 7/1974 | Langer | 360/38 |

Primary Examiner—Robert L. Richardson
Attorney, Agent, or Firm—Frank R. Trifari; Simon L. Cohen

[57] ABSTRACT

A device for the compensation of dropouts in an angle modulated signal. The device comprises a variable delay line, which receives a control signal from a control unit for variably delaying said angle-modulated signal. The control unit comprises a dropout detector and a transformation means co-operating therewith for supplying an output signal which is representative of the magnitude and the polarity of the dropout. Said output signal is applied to the variably delay means as a control signal.

6 Claims, 9 Drawing Figures

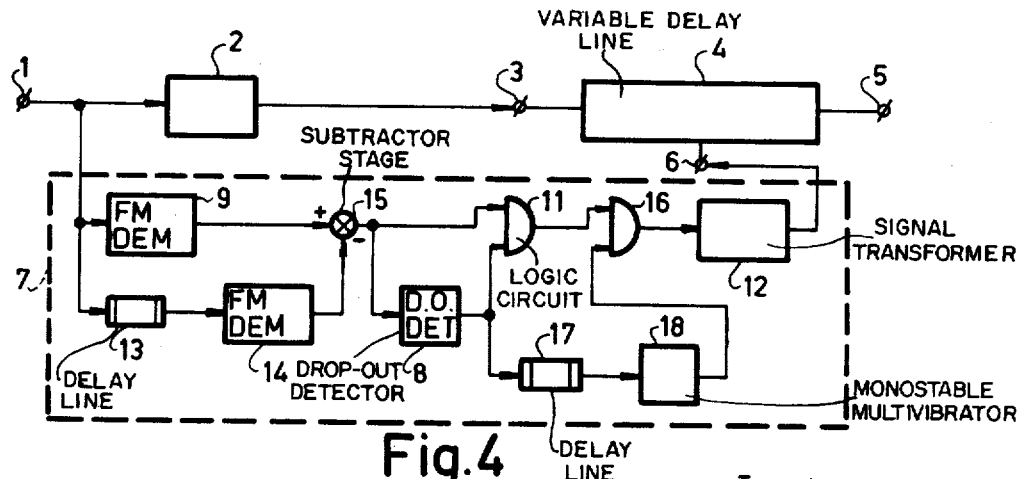
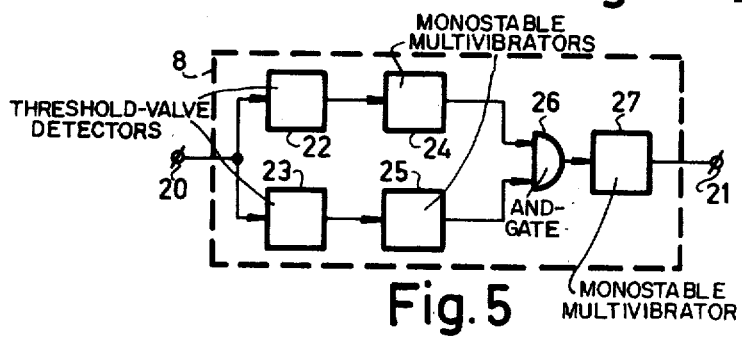
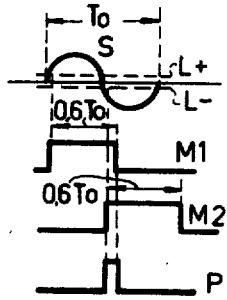
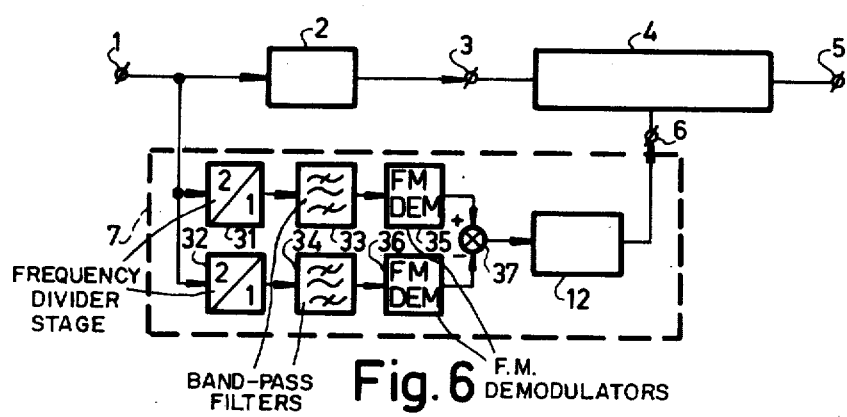

DEVICE FOR THE COMPENSATION OF DROP-OUTS IN A ANGLE-VELOCITY MODULATED SIGNAL

The invention relates to a device for the compensation of signal dropouts in an angle modulated signal. In this respect signal dropout is to be understood to mean any disturbance of the desired signal, i.e. not only a complete interruption of the signal. An angle-modulated signal is to be understood to mean a signal in which the information is contained as a shift of the zero-crossings of a carrier wave signal, for example by means of frequency or phase modulation, or for example by a combination of frequency modulation and pulse-width modulation.

Such a device for the compensation of signal dropouts is of special importance in recording and reproducing apparatus in which a signal, for example a complete color television signal, is recorded on a record carrier and is read with the aid of a reproducing system. In this respect disk-shaped record carriers may be considered inter alia which record carriers are read with the aid of an optical system.

The invention in particular relates to the compensation of comparatively small signal dropouts, i.e. signal dropouts which only cause an undesired shift of one edge of the angle modulated signal. In this respect reference is made to a video disk in which the information is recorded in a spiral track which consists of a sequence of pits alternating with intermediate areas. If owing to an irregularity in the record one wall of such a pit is affected, a signal dropout of the type mentioned above is produced. In particular in the case of a recorded color television signal such comparatively small dropouts may lead to relatively conspicuous disturbances.

It is an object of the invention to provide a device by means of which signal dropouts of the above-mentioned type can be compensated in a particularly accurate manner. For this, the invention is characterized in that the device is provided with a variable delay line with an input terminal, an output terminal and a control terminal, the input terminal receiving the angle-modulated signal, the output terminal supplying the delayed signal and the delay introduced by said variable delay line being a function of a first control signal at the control terminal, while the device furthermore includes a control unit for supplying said first control signal, which control unit comprises a dropout detector for detecting signal dropouts in the angle-modulated signal and for supplying a corresponding detection pulse, and a transformation means which co-operates with said dropout detector for supplying an output signal whose magnitude and polarity is substantially linearly dependent on the magnitude and polarity respectively of the signal disturbance which occurs during a detected dropout, which output signal is applied to the variable delay line as the first control signal.

Dropout detectors are known in many modifications. Any detection circuit, which is capable of detecting small signal dropouts of the above-mentioned type may be used in the device according to the invention. A first embodiment of the device according to the invention for the compensation of signal dropouts in a frequency-modulated signal is characterized in that the control unit comprises a frequency demodulator for the demodulation of the frequency-modulated signal, a filter for extracting signal components with comparatively high frequencies from the signal which is supplied by the frequency demodulator, a logic circuit having a first input which is connected to the filter, and a second input which is connected to the dropout detector, which circuit is adapted to pass said signal component to the transformation means only if a signal dropout has been detected, which transformation means comprises a level detector and a polarity detector for supplying the desired control signal.

A second embodiment, adapted to a signal which contains a television signal as information, is characterized in that the control unit comprises a first frequency demodulator for the demodulation of the frequency-modulated signal, a first delay line with a delay time equal to one line period of the television signal, to which the frequency modulated signal is applied, a second frequency demodulator for demodulating the signal which has been delayed by the delay line, a subtractor stage for subtracting the output signals of the first and second frequency demodulators from each other, a logic circuit having a first input which is connected to said subtractor stage, and a second input which is connected to the dropout detector, which circuit is adapted to pass the output signal of the subtractor stage to the transformation means only if the dropout detector supplies a detection pulse. In said second embodiment dropout detection can be effected in a special manner, for which the device is characterized in that the dropout detector comprises an input, which is coupled to the output of the subtractor stage and which is of a type which supplies an output pulse if the signal which is applied to its input during a specific constant time interval passes through a complete period of an at least approximately sinusoidal signal, and that the device is further provided with a second delay line having a delay time equal to one line period of the television signal and an inhibiting circuit, said inhibiting circuit receiving a supplied detection pulse via the delay line and during said delayed detection pulse inhibits the passage of a signal to the transformation circuit.

A third embodiment of the device according to the invention for the compensation of signal dropouts in a frequency modulated signal is characterized in that the control unit comprises a first frequency divider, which receives the frequency-modulated signal and which supplies a first sub-multiple signal, whose successive zero crossings correspond to the zero crossings of the rising edges of the frequency-modulated signal, a second frequency divider which supplies a second sub-multiple signal, whose successive zero crossings correspond to the zero crossings of the falling edges of the frequency-modulated signal, a first frequency-demodulator for the demodulation of the first sub-multiple signal, a second frequency demodulator for the demodulation of the second sub-multiple signal, a subtractor stage for determining the difference between the output signals of said frequency demodulators and supplying the difference signal to the transformation means.

Figure 2:
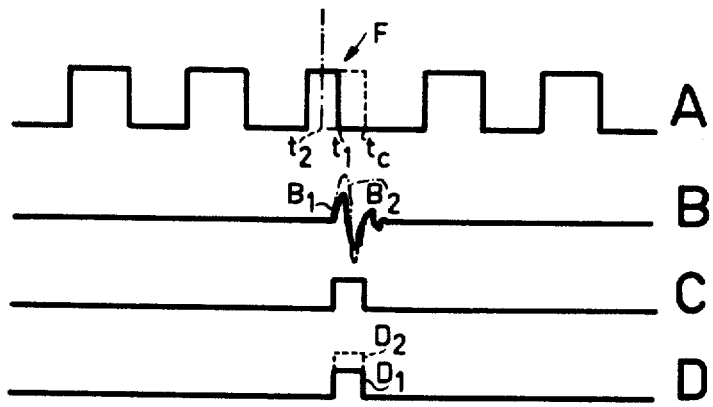

The invention will now be described in more detail with reference to the embodiments shown in the Figures, in which FIG. 1 schematically shows a first embodiment of the device according to the invention, and FIG. 2 shows some signal waveforms which then occur.

Figure 3:
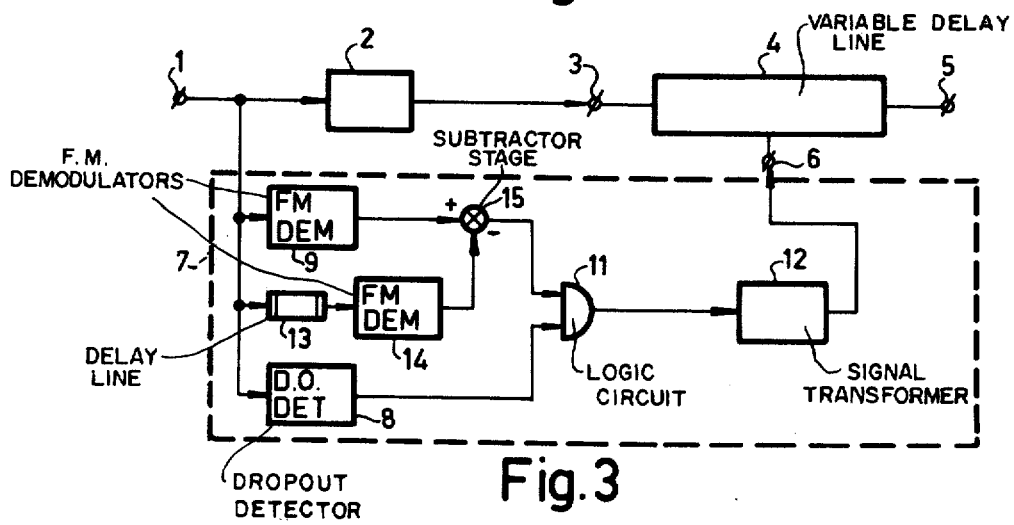

FIGS. 3 and 4 show two alternative embodiments, whilst

Figure 7:
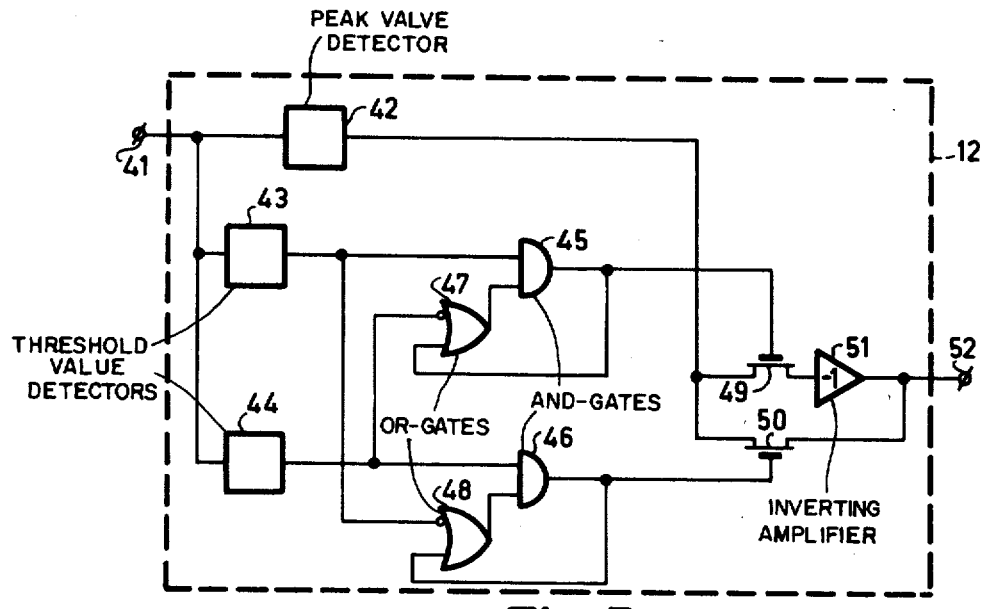
Figure 8:
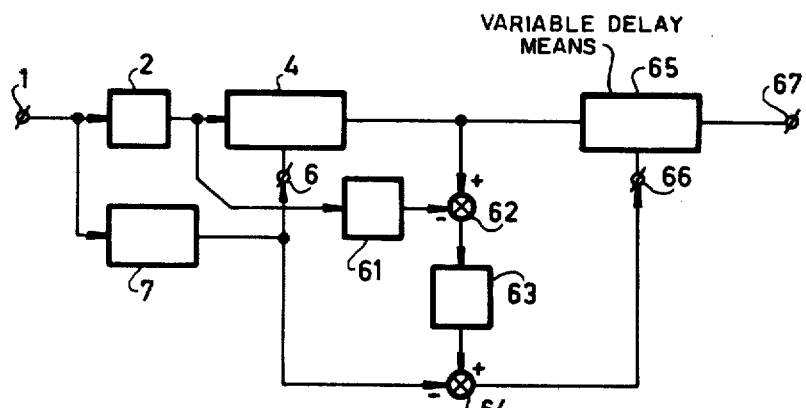

FIG. 5 shows a special embodiment of the dropout detector and FIG. 5a shows the associated signal waveforms, FIG. 6 shows a fourth embodiment of the device according to the invention, while FIG. 7 schematically shows an embodiment of the transformation means employed in the device according to the invention, and FIG. 8 represents an improvement to the compensation method employed in the device according to the invention.

The first embodiment of the device according to the invention shown in FIG. 1 comprises a terminal 1 to which the angle-modulated signal is applied. As previously stated, the device is particularly suited for use in read equipment for record carriers, such as disk-shaped record carriers. On such a record carrier a complete color television signal can be recorded by frequency-modulating a carrier wave with a composite standard colour television signal, for example in accordance with the PAL, SECAM or NTSC standard. In the case of other coding techniques the luminance and chrominance components are separated from each other and are processed individually. For example, it is known to add the luminance component to a carrier wave as a frequency modulation and to add the chrominance component after transformation as a pulse-width modulation to said frequency-modulated signal. The device according to the invention may also be used in conjunction with this type of coding systems, in which case its influence of course substantially extends to the angle-modulated signal only, i.e. the luminance component. The manner in which the various components of the color television signal are mutually coded is of minor importance for the principle of the invention. The invention may be used to advantage whenever there is a significant signal component which is recorded as an angle modulated signal. For simplicity it will be assumed that the signal which is applied to terminal 1 is frequency-modulated.

The device according to the invention further comprises a variable delay means 4 having an input terminal 3, an output terminal 5 and a control terminal 6. Said variable delay means may be of any known type such as analog shift registers such as bucket brigades, CCD's (charge coupled devices), memories with parallel storage capacitances and so-called varactors. All these delay means have the property that a signal which is applied to their input terminal 3 becomes available at their output terminal after a certain delay time, the delay time which is realized being determined by the magnitude of the control signal at the control terminal 6. With some of said delay means, such as the bucket brigades, said control signal is converted into a clock signal, whose frequency is proportional to said control signal and which determines the shifting speed of the signal and thus the delay time. In other delay means such as the varactor, a direct voltage is used as the ultimate control signal, so that generally conversion of the control signal applied to terminal 6 is not necessary. The embodiment of the delay means and the shape of the ultimately used control signal is irrelevant for the principle of the invention.

In order to obtain a suitable control signal for the variable delay means the compensation device includes a control unit 7, which receives the angle modulated signal from terminal 1. In the present embodiment said control unit 7 first of all comprises a dropout detector 8. This may be any arbitrary detector, providing that it is capable of detecting the comparatively small signal dropouts in question. Examples to be mentioned are the envelope detector, i.e. the detector which continuously measures the value of the envelope of the frequency-modulated signal, and the spectral-band detector which detects when a signal component appears in a normally free spectral band owing to a dropout. Systems employing a phase-locked loop may also be used or detection systems as described in the applicant's U.S. Pat. No. 3,925,811 or the previous U.S. Pat. No. 3,912,858. All these dropout detectors supply a detection pulse during a detected dropout in the frequency-modulated signal at terminal 1.

Said frequency-modulated signal is also applied to an FM demodulator 9, in which the signal is demodulated. The output signal of said FM demodulator is fed via a band-pass filter 10 to a first input of a logic circuit 11, which has a second input which is connected to the dropout detector. The band-pass filter 10 has a pass-band which at one end is limited by the bandwidth of the FM demodulator 9, for example 4 MHz and at the other end by the maxima frequency of the information component which is present in the demodulator signal, for example 3 MHz. In the present example, the band-pass filter would consequently cover a frequency band from 3 to 4 MHz. As long as the frequency-modulated signal only contains the desired information there will appear no signal at the output of the band-pass filter 11. However, when a dropout has occurred, this will result in a spurious signal outside the 3 MHz bandwidth of the demodulated signal, and a damped oscillation effect will be produced at the output of the band-pass filter.

To clarify the operation of the device according to the invention, FIG. 2 shows a number of signal waveforms. This FIG. 2 first of all shows the frequency-modulated signal A which is applied to terminal 1. For simplicity, it has been assumed that said signal has a constant frequency. At a specific instant (F), however, a dropout occurs, which results in a falling edge, which should occur at the instant $t_c$ (dashed line) now occurs in the instant $t_1$. As previously stated, such a dropout results in a damped oscillation B at the output of the band-pass filter 10, in this case the oscillation $B_1$. To illustrate the effect of the magnitude of the signal dropout, the situation is also shown in which the falling edge already appears at the instant $t_2$. This signal dropout results in an oscillation $B_2$ at the output of the band-pass filter 10. The periods of the two oscillations $B_1$ and $B_2$ are practically equal and are determined by the pulse response of the band-pass filter, while it is found that the amplitude is unambiguously determined by the magnitude of the dropout, i.e. the magnitude of the edge shift $t_c - t_1$ and $t_c - t_2$.

Said signal B and the detection signal C from the dropout detector 8, which for example has a width which corresponds to one period of the signal B, are applied to the logic circuit 11, which consequently transfers only this one period of the signal B to the transformation means 12. Said transformation means 12 serve to transform the information about the magnitude of the dropout, which is contained in the amplitude of the oscillation, into a suitable control signal for the variable delay line, namely a d.c. signal D. As can be seen in the Figure, said control signal D varies in such a way that during the dropout said control signal assumes a value ($D_1$ or $D_2$) which is proportional to the amplitude of the oscillation B.

In the situation shown the delay time of the variable delay means 4 is increased owing to said control signal D, viz. in such a way that the erroneous falling edge is shifted in time towards the desired position $t_c$, so that at the output 5 of the delay means a frequency-modulated signal becomes available in which the dropout has been compensated for. In order to ensure that the control of the variable delay line by the control signal is correctly timed and also to compensate for delays occurring in the control unit 7, a fixed-delay unit 2 has been included between terminal 1 and the input terminal 3 of the variable delay means 4.

FIG. 3 shows a second embodiment of the device according to the invention, in which corresponding elements are designated by the same reference numerals as in FIG. 1. The only difference with the embodiment of FIG. 1 is the design of the control unit 7. Said control unit comprises a dropout detector 8, which again may be of any known type. Furthermore said control unit includes the frequency demodulator 9, which receives the frequency-modulated signal from terminal 1. Said frequency-modulated signal is also applied to a delay line 13, which may for example be an ultrasonic glass delay line, which delay line delays the applied signal by one line period (approx. 63 $\mu$secs) of a television signal. The delayed signal is then demodulated with the aid of FM demodulator 14 and subtracted from the undelayed demodulated signal from the FM demodulator with the aid of a subtractor stage 15.

The output signal of said subtractor stage is applied to the logic circuit 11, which also receives the detection signal from the dropout detector 8. The output of said logic circuit, in its turn, is coupled to the transformation means 12, which finally supplies the desired control signal to the variable delay means.

This embodiment of the device according to the invention is in particular intended to be used for the reproduction of television signals. The operation of this embodiment is based on the fact that the information which is contained in two identical horizontal positions of two consecutive lines of a television picture generally differs only slightly. This means that normally the output signal of the subtractor stage 15 will be practically zero. However, if during a specific line a dropout occurs, said subtractor stage 15 will supply an output signal. This output signal appears to be a single period of a sinusoidal signal of constant invariable period, as has already been described in the previous U.S. Pat. No. 3,912,858. It now appears that the amplitude of the resulting signal is again an unambiguous measure of the magnitude of the dropout, i.e. the shift of the relevant edge in the frequency-modulated signal, so that via the transformation means 12 a suitable control signal can be obtained.

FIG. 4 shows a third embodiment of the device according to the invention, which substantially corresponds to the embodiment of FIG. 3. However, in this case the dropout detector 8 does not receive the frequency-modulated signal from terminal 1, but is coupled to the output of the subtractor stage 15 and has a specific circuit arrangement, as described in the Applicant's previous U.S. Pat. No. 3,912,858.

As previously stated, the output signal of the subtractor stage 15 has a specific signal waveform when a dropout occurs, namely one period of an at least substantially sinusoidal signal of constant specific period. The embodiment shown employs this by adapting the dropout detector so that it responds to said specific waveform. For this purpose use can for example be made of a so-called "matched filter". Such a filter generally employs a delay means, which is branched at several points and in which via a resistor network, adder circuit and threshold value detector a pulse is obtained if a certain specific signal waveform occurs. Such filters are for example described in the magazine "I.R.E. Transactions", Vol. IT-6, No. 3, June 1960, "Special issue on matched filters".

Another very simple possibility of detecting the specific signal waveform is represented in FIG. 5 and corresponds to the possibility described in the U.S. Pat. No. 3,912,858. The dropout detector 8 comprises an input terminal 20 to which the output signal of the subtractor stage 15 is applied. As already stated, said output signal has a specific waveform during a dropout, viz. one period of a sinusoidal signal of specific period, suppose $T_o$, as is designated by S in FIG. 5a. The input terminal 20 of said dropout detector 8 is now connected to the inputs of two threshold-value detectors 22 and 23. One of said threshold-value detectors, for example 22, has a positive threshold (L+) and the other a negative threshold value (L−). When the signal S exceeds the threshold value L+ the threshold value detector 22 consequently supplies a pulse and when said signal S drops below the threshold value L− the threshold value detector 23 supplies a pulse. With the aid of monostable multivibrators 24 and 25 pulses are derived from the pulses of the threshold value detectors, having a pulse duration which is slightly greater than half the period 0.5 $T_o$ of the specific signal waveform S, for example 0.6 $T_o$. FIG. 5a shows that when the specific signal waveform S appears the pulses $M_1$ and $M_2$ supplied by the multivibrators 24 and 25 overlap each other. This fact is utilized by detecting said overlap P with the aid of an AND-gate 26, to which these two pulses $M_1$ and $M_2$ are applied. Finally, by means of a monostable multivibrator 27 a pulse corresponding to the dropout duration and derived from the pulse P supplied by said AND-gate 26 is obtained at the output 21, which can be proved experimentally.

As is shown in FIG. 4 said detection pulse from the dropout detector 8 is again applied to the logic circuit 11 together with the output signal of the subtractor stage 15. Subsequently, the desired control signal for the variable delay means 4 is derived from the output signal of said logic circuit 11 with the aid of the transformation circuit 12. In view of the method of dropout detection an additional step is to be taken in order to prevent an erroneous dropout indication. As with the aid of the subtractor stage 15 always the difference of the signal contents of two consecutive television lines is measured, a dropout in one specific line results in the specific waveform S occurring in the output signal of the subtractor stage 15 in inverted form and one line period later. Said second wave form would lead to an erroneous dropout indication. In order to prevent this, as has been described previously in the cited U.S. Pat. No. 3,912,858, the output of the dropout detector 8 is connected to a delay line 17, which introduces a delay of one line period. A detection pulse supplied by said dropout detector 8 is thus delayed by one line period by said delay line 17 and applied to a gate 16, as the case may be via a monostable multivibrator 18 by means of which the pulse width may be changed. Said gate 16 is inserted in the connection between the logic circuit 11 and the transformation circuit 12 and has been designed so that no signal passage is possible when a pulse is received from the multivibrator 18. Thus, the specific signal waveform at the output of the logic circuit 11, which waveform has been delayed by one line period, is prevented from being transferred to the transformation circuit 12. Obviously, such a blocking circuit can also be made to act on the dropout detector.

FIG. 6 shows a fourth embodiment of the device according to the invention. In this embodiment the control unit 7 largely corresponds to the dropout detection system described in U.S. Pat. No. 3,925,811. Said control unit 7 now comprises two frequency divider stages 31 and 32, to which the frequency-modulated signal is applied. The frequency divider stage 31 then supplies a signal whose edges correspond to the rising edges of the frequency-modulated signal, while the frequency divider stage 32 supplies a signal whose edges correspond to the falling edges of the frequency-modulated signal. The two sub-multiple signals are applied via band-pass filters 33 and 34 to two FM demodulators 35 and 36 whose output signals are fed to a subtractor stage 37. As long as the frequency-modulated signal at the input 1 is correct, the information contents of the rising and falling edges will be the same, so that the output signal of the subtractor stage 37 is zero. Upon the appearance of a dropout, which results in a shift of one edge, this information contents differs so that a difference signal appears at the output of the subtractor stage. Said difference signal, in its turn, may be employed for supplying the control signal for the variable delay line via the transformation circuit 12.

For the transformation circuit 12 many embodiments are possible which are obvious to those skilled in the art. FIG. 7 shows a possible embodiment for the purpose of illustration. The input 41 of the transformation circuit is connected to a peak value detector 42, which consequently supplies a d.c. output signal whose value is a measure of the magnitude of the signal dropout. For a correct compensation it is now only necessary to obtain an indication of the polarity of said dropout, i.e., the direction in which the relevant edge of the frequency-modulated signal has been subjected to the undesired shift. Depending on said shifting direction the signal applied to the input 41 first has a positive or first a negative half period. The signal waveform B shown in FIG. 2 first has a positive half period in the case of a premature appearance of the relevant edge in the signal A. Should the edge appear later than the instant $t_c$ the signal waveform B would be inverted, so that first a negative half period would appear.

In order to determine this direction of the edge shift the shown embodiment of the transformation circuit 12 comprises two threshold value detectors 43 and 44, one of which has a positive threshold value and the other edge a negative threshold value. Said threshold value detectors supply a pulse of specific length at their outputs, which length is greater than the duration of the detection pulse from the dropout detector, when their respective threshold value is exceeded by the signal at the input 41. Depending on the polarity of the signal dropout either the threshold value detector 43 or the threshold value detector 44 first supplies a pulse. Whichever of these two possibilities occurs can be detected with the aid of a logic circuit consisting of two AND-gates 45 and 46 and two OR-gates 47 and 48 in accordance with the circuit arrangement shown. When the threshold value detector 43 is the first one which supplies a pulse, a logic 1 will appear at the output of the AND-gate 45 and a logic 0 at the output of the AND-gate 46 during the dropout. However, if the threshold value detector 44 is the first one which supplies a pulse, the AND-gate 45 supplies a logic 0 and the AND-gate 46 a logic 1.

The outputs of these two AND-gates 45 and 46 control two switching transistors 49 and 50, which together are connected to the peak detector 42 by one main electrode. In the conductive state the switching transistor 50 transfers the measured peak value directly to an output 52 of the transformation circuit 12. In the conductive state the switching transistor 49 transfers said measured peak value to said output 52 via an inverting amplifier 51. As a result, a d.c. signal is obtained at said output, which signal is not only representative of the magnitude but also of the polarity of the dropout and consequently causes an increase or decrease of the average delay of the variable delay means.

FIG. 8 finally shows a further elaboration of the compensation device, where a closed loop system is obtained. The compensation device comprises the variable delay means 4, which via the control unit 7 receives the required control signal. Thus, the output signal of said variable delay means has already been subjected to a correction with respect to signal dropouts. Since the accuracy of this delay means is limited, a specific residual error will persist. In order to reduce said residual error a second variable delay means 65 is added, which receives the output signal of the delay means 4 and which yields a further corrected output signal at the terminal 67.

The control signal to the control terminal 66 of said delay means 65 is obtained as follows. The output signal of the delay means 4 is applied to a subtractor stage 62, to which via a device 61 also the input signal of said delay means 4 is supplied. The device 61 provides a delay which equals the delay of the delay means 4 in the case that no dropout is detected. As a result, the subtractor stage 62 normally supplies no output signal, but only produces a pulse upon the appearance of a signal dropout. The pulse width is then dependent on the shift caused by the variable delay means 4. Said shift should be related directly to the magnitude of the dropout. This implies that by transformation of the pulse width of the output signal of the subtractor stage 62 into a direct voltage a value for said direct voltage would have to be found, which corresponds to the direct voltage supplied by the control unit 7. By subsequently applying these two voltages to a subtractor stage 64 a difference signal is obtained, which is suitable to serve as control signal for the variable delay means 65.

It is to be noted that the scope of the invention is by no means limited to the embodiments shown in the Figures, but that modifications thereof can readily be realized. The elements shown in these embodiments are known in many versions and can readily be designed by those skilled in the art.

What is claimed is:

1. A device for the compensation of dropouts in an angle modulated signal, comprising a signal controlled linearly variable delay line with an input terminal, an output terminal and a control terminal, the input terminal receiving the angle-modulated signal, the output terminal supplying the delayed signal, and the delay introduced by said variable delay line being a function of a first control signal at the control terminal, a control unit for supplying said first control signal, said control unit comprising a dropout detector for detecting the duration and polarity dropouts in the angle-modulated signal and for supplying a corresponding detection pulse, and a transformation means receiving said detection pulse from said dropout detector for supplying an output signal corresponding to the duration and polarity of the signal disturbance which occurs during a detected dropout, and means for applying the output signal from said transformation means to the control terminal of the variable delay line as the first control signal.

2. A device as claimed in claim 1, for the compensation of dropouts in a frequency-modulated signal, wherein the control unit comprises a frequency demodulator for demodulating the frequency-modulated signal, a filter for extracting signal components with comparatively high frequencies outside the frequency band of the desired signal from the signal supplied by the frequency demodulator, a logic circuit having a first input which is connected to the filter, and a second input which is connected to the dropout detector, which circuit is adapted to transfer said signal component to the transformation means only when a dropout has been detected.

3. A device as claimed in claim 1, for the compensation of dropouts in a frequency-modulated signal which contains a television signal as information, wherein the control unit comprises a first frequency demodulator for the demodulation of the frequency-modulated signal, a first delay line with a delay time equal to one line period of the television signal, to which the frequency-modulated signal is applied, a second frequency demodulator for demodulating the signal which has been delayed by the delay line, a subtractor stage for subtracting the output signals of the first and second frequency demodulators from each other, a logic circuit having a first input which is connected to said subtractor stage, and a second input which is connected to the dropout detector, which logic circuit is adapted to transfer the output signal of the subtractor stage to the transformation means only if the dropout detector supplies a detection pulse.

4. A device as claimed in claim 3, wherein the dropout detector comprises an input, which is coupled to the output of the subtractor stage and which is of a type which supplies an output pulse if the signal applied to its input during a specific constant time interval passes through a full period of an at least substantially sinusoidal signal with a predetermined period time, and that the device is further provided with a second delay line having a delay time equal to one line period of the television signal, and an inhibiting circuit, said inhibiting circuit via the delay line receiving a produced detection pulse and during said delayed detection pulse no longer transfers any signals to the transformation circuit.

5. A device as claimed in claim 1 for the compensation of dropouts in a frequency-modulated signal, wherein the control unit comprises a first frequency divider, which receives the frequency-modulated signal and which supplies a first sub-multiple signal, whose successive zero crossings correspond to the zero crossings of the rising edges of the frequency-modulated signal, a second frequency divider which supplies a second sub-multiple signal whose successive zero crossings correspond to the zero crossings of the falling edges of the frequency-modulated signal, a first frequency demodulator for demodulating the first sub-multiple signal, a second frequency demodulator for demodulating the second sub-multiple signal, a subtractor stage for determining the difference between the output signals of said frequency demodulators and supplying the difference signal to the transformation means.

6. A device as claimed in claim 1, wherein the transformation means comprises an amplitude detector for determining the amplitude of the applied signal and a logic circuit for determining the polarity of the dropout.

* * * * *